(12) United States Patent
Furuta

(10) Patent No.: US 6,536,724 B2
(45) Date of Patent: Mar. 25, 2003

(54) GIMBAL MECHANISM

(75) Inventor: Yuuji Furuta, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/955,075

(22) Filed: Sep. 19, 2001

(65) Prior Publication Data

US 2002/0033434 A1 Mar. 21, 2002

(30) Foreign Application Priority Data

Sep. 21, 2000 (JP) ........................................ 2000-287496

(51) Int. Cl.⁷ ................................................ F16M 11/12
(52) U.S. Cl. ................................ 248/183.2; 248/178.1; 248/487; 248/583
(58) Field of Search .............................. 248/583, 183.2, 248/276.1, 278.1, 178.1, 487, 105, 106

(56) References Cited

U.S. PATENT DOCUMENTS

| | | | | | |
|---|---|---|---|---|---|
| 2,945,414 A | * | 7/1960 | Blackstone | ............... | 346/107.2 |
| 3,028,592 A | * | 4/1962 | Parr et al. | .................... | 244/175 |
| 3,731,544 A | * | 5/1973 | Acker et al. | ................ | 244/3.18 |
| 3,979,090 A | * | 9/1976 | Brickner et al. | ............. | 244/175 |
| 4,270,393 A | * | 6/1981 | Osborne et al. | ......... | 248/179.1 |

* cited by examiner

Primary Examiner—Kimberly Wood
Assistant Examiner—Deborah M. Brann
(74) Attorney, Agent, or Firm—Oblon, Spivak, McClelland, Maier & Neustadt, P.C.

(57) ABSTRACT

A gimbal is rotatably supported about a Z axis by one pair of support columns fixed to a mounting surface. A motor and angle detector are provided on the gimbal to control a rotation of an image pickup section about a Y axis. By a coil unit formed on the mounting surface, a magnet mounted on the gimbal is driven to rotate the gimbal about a Z axis. The rotation angle of the gimbal is detected by a relative positional relation between a sensor head fixed to the gimbal and rod bent in an arc-like configuration to follow a rotation focus of the gimbal.

2 Claims, 3 Drawing Sheets

GIMBAL MECHANISM

CROSS-REFERENCE TO RELATED APPLICATIONS

This application is based upon and claims the benefit of priority from the prior Japanese Patent Application No. 2000-287496, filed Sep. 21, 2000, the entire contents of which are incorporated herein by reference.

BACKGROUND OF THE INVENTION

1. Field of the Invention

The present invention relates to a gimbal mechanism provided, for example, at a nose of a guided flying object to aim an image pick-up device at a target direction.

2. Description of the Related Art

In a gimbal mechanism used in a guided flying object, a drive motor and angle detector are arranged on each of Y and Z axes to drive an image pickup device about two axes (Y and X axes). In this structure, the drive motor and angle detector provide an obstacle to the movement of the image pickup device and the aperture of the image pickup device is restricted by that extent. In the present situation, more amount of light cannot be incident on the image pickup device and it is difficult to improve the performance of the image pickup device. In particular in the case where the gimbal mechanism of the above-mentioned structure is mounted at the nose of the flying object and used as a guided device, more restrictions are added due to its body size and mounting space. As a result, it is not possible to increase the aperture of the image pickup device and, any longer, to expect an improvement of a target acquisition capability.

BRIEF SUMMARY OF THE INVENTION

The present invention provides a gimbal mechanism adapted to rotate a to-be-supported body (for example, an image pickup section) about mutually orthogonal first and second axes (for example, Y and Z axes), the gimbal mechanism comprising a support frame (for example, a gimbal) rotatably supporting the to-be-supported body about the first axis and having an extension place opposite to a mounting surface at least in a fixed position, one pair of support pieces (for example, support columns) fixed to a mounting surface to rotatably support the support frame about the second axis, a first motor (for example, a motor) mounted on the support frame to rotate the to-be-supported body about the first axis, a first angle sensor (for example, an angle detector) mounted on the support frame to detect a rotation angle of the to-be-supported body about the first axis, a second motor (for example, a magnet and coil unit) for imparting a drive force to a place of the support frame on a side of, and opposite to, the mounting surface to rotate the support frame, as a whole, about the second axis, and a second angle sensor (for example, a sensor head and rod) for detecting a rotation angle of the support frame about the second axis from a movement locus of a specific position defined by the rotation of the support frame about the second axis.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiment of the present invention will be described below with reference to the accompanying drawing.

Figure 1:
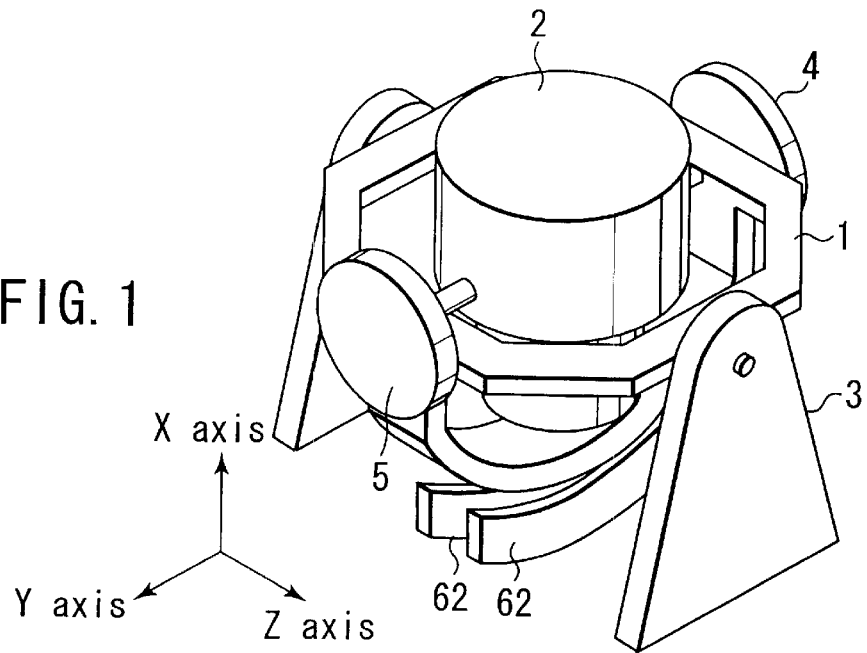
FIG. 1 shows a structure of a gimbal mechanism according to an embodiment of the present invention.

FIG. 1 shows a structure of a gimbal mechanism according to an embodiment of the present invention. In the gimbal mechanism shown in FIG. 1, an image pickup section 2 is mounted as a to-be-supported body. The image pickup section 2 is rotatably supported by the gimbal 1 about a Y axis. The gimbal 1 is rotatably supported by one pair of support columns 3 about a Z axis, noting that the paired support columns are fixed to a mounting surface (not shown). By doing so, the image pickup section 2 is freely operated about the mutually orthogonal Y and Z axes. A coil unit 62 is provided on a mounting surface to rotate the gimbal 1 about the Z axis.

A motor 4 and angle detector 5 are mounted on the gimbal 1. The motor 4 rotates the image pickup section 2 about the Y axis and the angle detector 5 detects the rotation angle of the image pickup section 2 along the Y axis.

Figure 2:
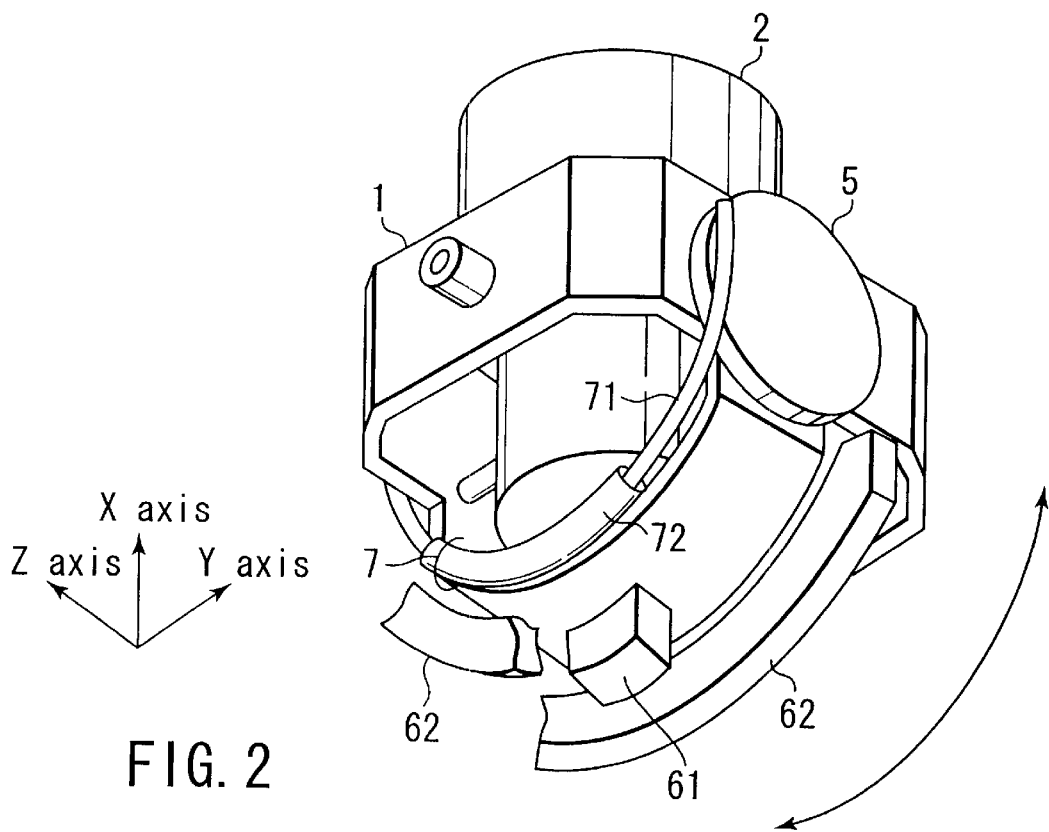
FIG. 2 is a view showing a more detailed structure of the gimbal mechanism shown in FIG. 1.

FIG. 2 is a view showing a more detailed structure of the gimbal mechanism shown in FIG. 1. In FIG. 2, a magnet 61 is mounted on the gimbal 1 at an extension place opposite to the mounting surface.

The coil unit 62 is formed in an arc-like configuration to follow a movement locus of the magnet 61 defined by the rotation of the gimbal 1 about the Z axis and is electromagnetically coupled to the magnet 61. The coil unit 62 and magnet 61 are co-acted to allow the gimbal 1 to be operated about the Z axis under the so-called "linear motor" operation principle. That is, by applying electric current to the coil unit 62 and controlling the direction of the flowing of the current, the magnet 61 is electromagnetically operated. The magnet 61, being fixed to the gimbal 1, can operate the gimbal 1.

In FIG. 2, there is further provided an angle detector 7 for detecting the angle of the rotation of the gimbal 1 about the Z axis. The angle detector 7 includes a sensor head 72 mounted on the gimbal 1 at a specific place and a rod 71 which is formed in an arc-like configuration to follow the movement locus of the sensor head 72. The angle of the rotation of the gimbal 1 about the Z axis is detected by a relative positional relation between the sensor head 72 and the rod 71.

Figure 3:
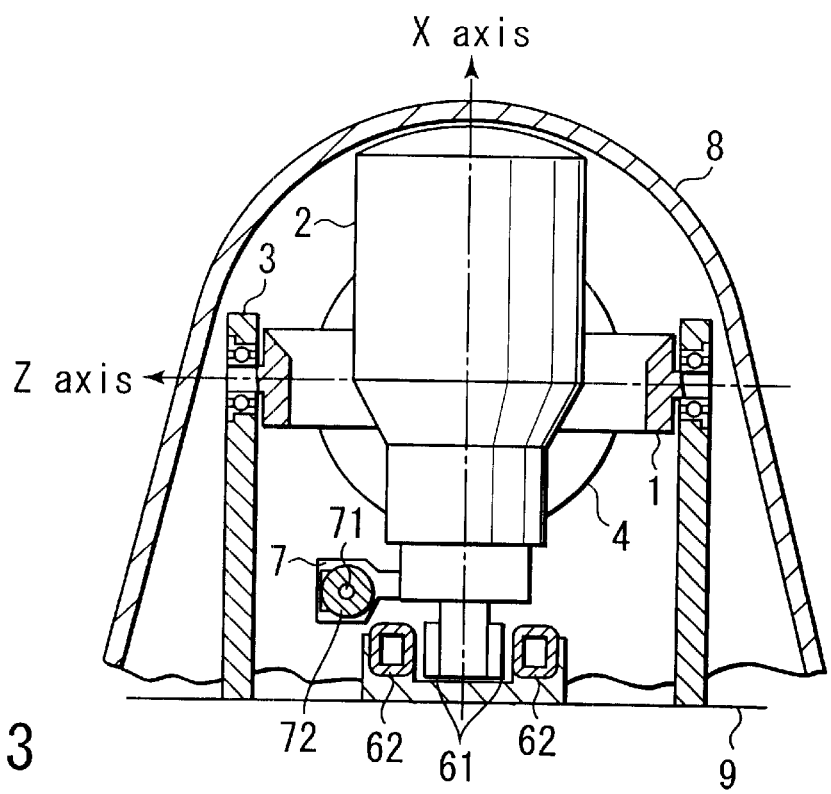
FIG. 3 is a cross-sectional view of the gimbal mechanism shown in FIG. 1.
Figure 4:
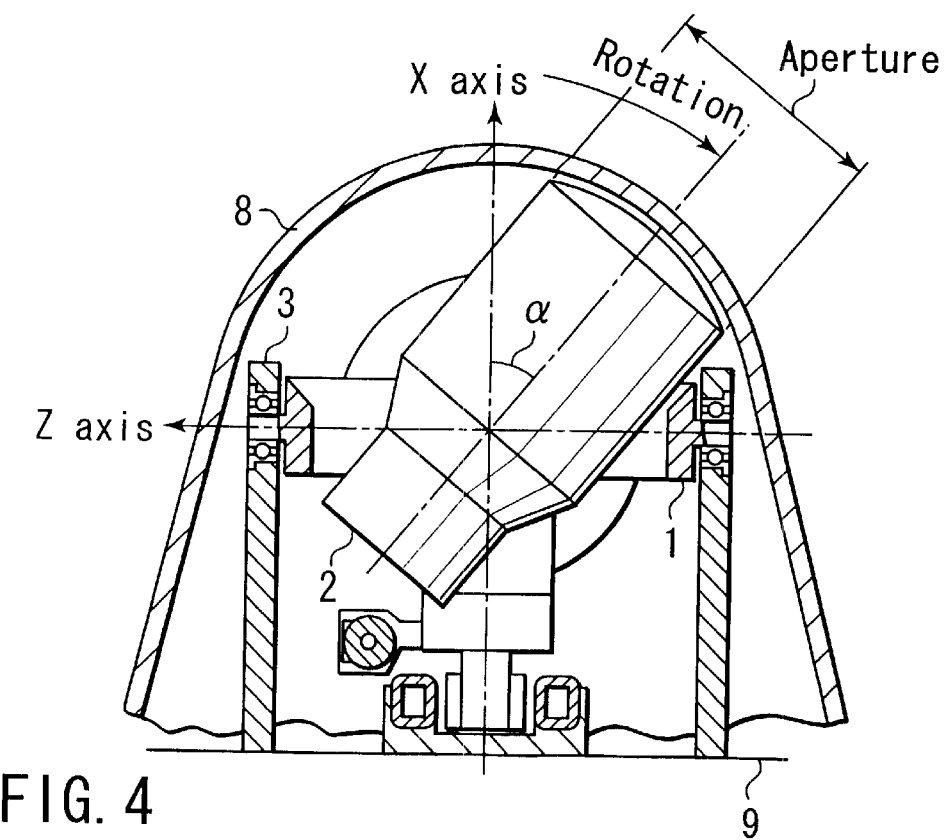
FIG. 4 is a view showing an image pickup section 2 in an inclined state relative to FIG. 3.

FIGS. 3 and 4 are cross-sectional views of the gimbal mechanism shown in FIG. 1. The gimbal mechanism is so mounted at a nose of, for example, a flying object (not shown) as to be surrounded with a cover 8.

As shown in FIG. 3, the magnet 61 is so located as to be sandwiched with the coil unit 62 and the sensor head 72 is located such that the rod 71 is surrounded in an annular fashion.

According to the above-mentioned arrangement, the motor and angle detector adapted to control the rotation of the gimbal about the Z axis can be eliminated off the Z axis. If, therefore, the image pickup section 2 is inclined from a state shown in FIG. 3 toward the direction of FIG. 4, less interference can be ensured between the image pickup section 2 and the support columns 3. Therefore, it is possible to provide a greater aperture to the image pickup section 2.

Figure 5:
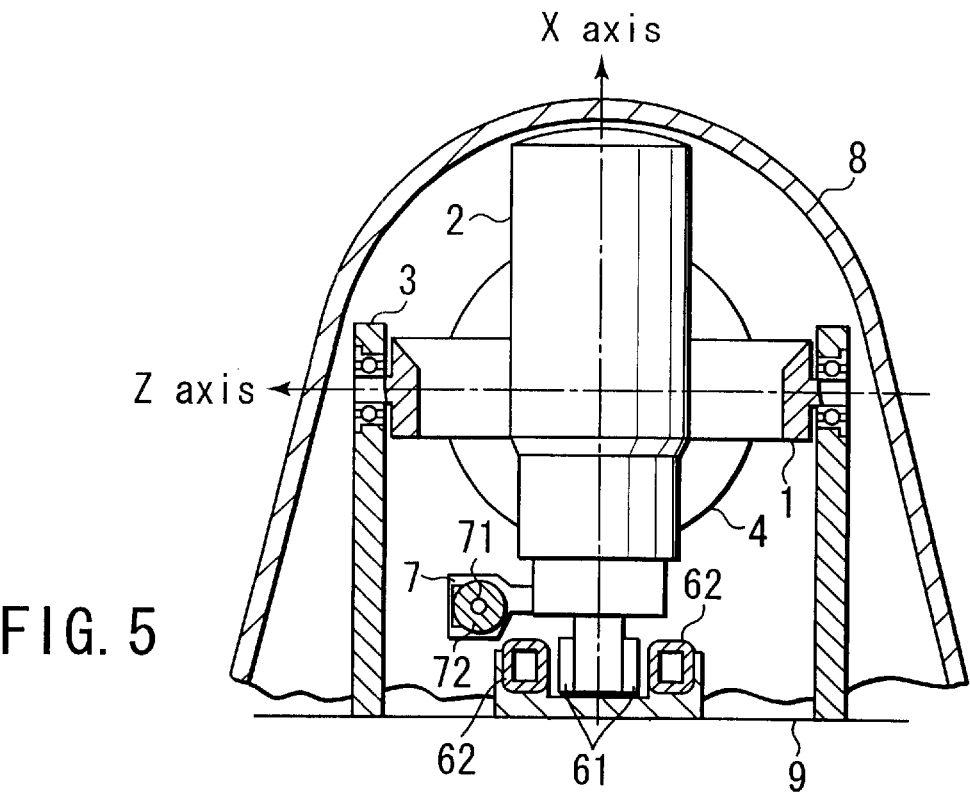
FIG. 5 shows another form of a gimbal mechanism according to an embodiment of the present invention.
Figure 6:
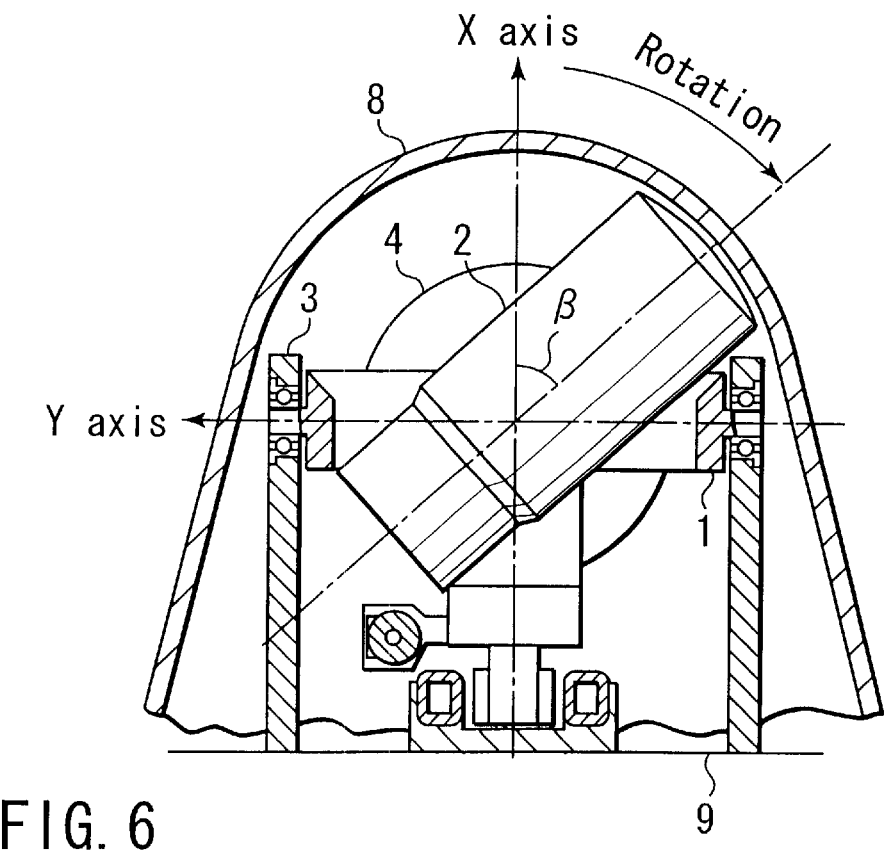
FIG. 6 is a view showing an image pickup device 2 in inclined state relative to FIG. 5.

FIGS. 5 and 6 are views for explaining another effect of the present embodiment. The image pickup section 2 shown in FIG. 5 has the same aperture as that of a conventional image pickup section. If the image pickup section 2 is rotated about the Y axis, as shown in FIG. 6, a maximal inclination angle is given by β and, in the gimbal mechanism shown in FIG. 4, a maximal inclination angle of the image pickup section 2 is given by α.

Upon comparison between α and β, β is greater by an extent corresponding to the aperture of the image pickup section 2. That is, in the present embodiment, it is possible to obtain a greater inclination angle of the image pickup section 2 about the Y axis than in a conventional gimbal mechanism. It is, therefore, possible to provide a greater visual field angle to the image pickup section 2 and hence to achieve an improved target acquisition capability.

In the present embodiment, therefore, the gimbal 1 is rotatably supported about the Z axis by the use of the paired support columns 3 fixed to the mounting surface 9. The motor 4 and angle detector 5 are mounted to the gimbal 1 to control the rotation of the image pickup section 2 about the Y axis. By the coil unit 62 provided on the mounting surface 9, the magnet 61 mounted on the gimbal 1 is driven to rotate the gimbal 1 about the Z axis. And the rotation angle of the gimbal 1 is detected by the relative positional relation between the sensor head 72 fixed to the gimbal 1 and the rod 71 bent in an arc-like configuration to follow the rotation focus of the gimbal.

By doing so, it is possible to eliminate the motor and angle detector on the Z axis. It is, therefore, possible to provide a margin to the mounting space of the image pickup section 2 and hence to provide a greater aperture to the image pickup section 2. By doing so, a gimbal mechanism can be provided which can achieve an improved target acquisition capability.

According to the present embodiment, further, the inclination angle of the image pickup section 2 about the Y axis can be made greater than in the conventional gimbal mechanism, provided that, for comparison, the apertures of the image pickup sections 2 are the same. It is, therefore, possible to provide a greater visual field angle to the image pickup section 2 and hence to provide a gimbal mechanism having an improved target acquisition capability.

It is to be noted that the present invention is not restricted to the above-mentioned embodiment. An electromagnetic wave transmitting/receiving antenna may be mounted to the gimbal mechanism shown, for example, in FIGS. 1 to 6 in place of the image pickup section 2. The gimbal mechanism of the present embodiment can be applied to an electromagnetic homing guided apparatus by using it in combination with an antenna. As another form of application, it may be possible to mount an image pickup device for monitoring cameras. The present invention can be variously changed or modified without departing from the essence of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A gimbal mechanism adapted to rotate a to-be-supported body about mutually orthogonal first and second axes, comprising:

a support frame rotatably supporting the to-be-supported body about the first axis and having an extension place opposite to a mounting surface at least in a fixed position;

one pair of support pieces fixed to a mounting surface and rotatably supporting the support frame about the second axis;

a first motor mounted on the support frame to rotate the to-be-supported body about the first axis;

a first angle sensor mounted on the support frame to detect a rotation angle of the to-be-supported body about the first axis;

a second motor for imparting a drive force to a place of the support frame on a side of, and opposite to, the mounting surface to rotate the support frame, as a whole, about the second axis; and a second angle sensor for detecting a rotation angle of the support frame about the second axis from a movement locus of a specific position defined by the rotation of the support frame about the second axis, wherein the second motor includes a magnet arranged in a place opposite to the mounting surface of the support frame and a drive coil unit arranged on the mounting surface and formed in an arcuate configuration to follow a movement locus of the magnet defined by the rotation of the support frame about the second axis, the drive coil unit being electromagnetically coupled to the magnet, and the magnet and drive coil unit being co-acted to rotate the support frame as a whole, about the second axis.

2. A gimbal mechanism adapted to rotate a to-be-supported body about mutually orthogonal first and second axes, comprising:

a support frame rotatably supporting the to-be-supported body about the first axis and having an extension place opposite to a mounting surface at least in a fixed position;

one pair of support pieces fixed to a mounting surface and rotatably supporting the support frame about the second axis;

a first motor mounted on the support frame to rotate the to-be-supported body about the first axis;

a first angle sensor mounted on the support frame to detect a rotation angle of the to-be-supported body about the first axis;

a second motor for imparting a drive force to a place of the support frame on a side of, and opposite to, the mounting surface to rotate the support frame, as a whole, about the second axis; and a second angle sensor for detecting a rotation angle of the support frame about the second axis from a movement locus of a specific position defined by the rotation of the support frame about the second axis, wherein the second angle sensor includes a sensor head mounted at said specific position and a rod provided on the mounting surface side and formed in an arcuate configuration to follow a movement locus of the sensor head, and the rotation angle of the support frame is detected by a relative positional relation between the sensor head and the rod.

* * * * *